(12) United States Patent
Kuwahara

(10) Patent No.: US 11,718,043 B2
(45) Date of Patent: Aug. 8, 2023

(54) PRODUCTION METHOD AND PRODUCTION DEVICE FOR THREE-DIMENSIONAL DECORATIVE PIECE MADE OF THERMOPLASTIC SYNTHETIC RESIN

(71) Applicant: Takeshi Kuroda, Osaka (JP)

(72) Inventor: Eiji Kuwahara, Osaka (JP)

(73) Assignee: Takeshi Kuroda, Osaka (JP)

( * ) Notice: Subject to any disclaimer, the term of this patent is extended or adjusted under 35 U.S.C. 154(b) by 617 days.

(21) Appl. No.: 16/756,096

(22) PCT Filed: Apr. 27, 2018

(86) PCT No.: PCT/JP2018/017109
§ 371 (c)(1),
(2) Date: Apr. 14, 2020

(87) PCT Pub. No.: WO2019/207746
PCT Pub. Date: Oct. 31, 2019

(65) Prior Publication Data
US 2021/0187864 A1 Jun. 24, 2021

(51) Int. Cl.
*B29C 65/04* (2006.01)
*B29C 65/74* (2006.01)
(Continued)

(52) U.S. Cl.
CPC .......... *B29C 65/04* (2013.01); *B29C 65/743* (2013.01); *B29C 66/71* (2013.01); *B44C 3/02* (2013.01)

(58) Field of Classification Search
CPC ... B29C 65/04; B29C 65/743; B29C 65/7451; B29C 65/32; B29C 66/71; B44C 3/02;
(Continued)

(56) References Cited

U.S. PATENT DOCUMENTS 3,126,307 A * 3/1964 Drittenbass ............. B29C 65/18
38/17
2007/0296118 A1* 12/2007 Kuwahaha ............... B27N 3/20
428/156
2008/0318074 A1 12/2008 Suga et al.

FOREIGN PATENT DOCUMENTS

CN 103240871 A 8/2013
EP 1813416 A1 * 8/2007 ............... B27N 3/20
(Continued)

OTHER PUBLICATIONS

Jun. 3, 2021 Office Action issued in Chinese Patent Application No. 201880072171.1.
(Continued)

*Primary Examiner* — John L Goff, II
(74) *Attorney, Agent, or Firm* — Oliff PLC

(57) ABSTRACT

A method and a device with which a bulky decorative piece made of a thermoplastic synthetic resin can be produced. A method for producing a three-dimensional decorative piece made of a thermoplastic synthetic resin includes a step of preparing a decorative piece material including an upper layer that has a thermoplastic synthetic resin film and a lower layer that has a thermoplastic synthetic resin sheet, a step of disposing the decorative piece material on a flat-plate die serving as an electrode, and a softening step of softening and welding the decorative piece material by bringing a flat-plate die serving as another electrode closer to the flat-plate die serving as the electrode, and performing high-frequency dielectric heating while pressing the decorative piece material.

2 Claims, 13 Drawing Sheets

(51) Int. Cl.
*B29C 65/00* (2006.01)
*B44C 3/02* (2006.01)

(58) Field of Classification Search
CPC . B32B 38/185; B32B 37/06; Y10T 156/1041;
Y10T 156/108; Y10T 156/1082
See application file for complete search history.

(56) References Cited

FOREIGN PATENT DOCUMENTS

| | | |
|---|---|---|
| EP | 2 578 382 A1 | 4/2013 |
| EP | 3 138 695 A1 | 3/2017 |
| JP | H06-254812 A | 9/1994 |
| JP | 3235943 B2 | 9/2001 |
| JP | 2015-036201 A | 2/2015 |
| WO | 2005/095081 A1 | 10/2005 |

OTHER PUBLICATIONS

May 21, 2021 Extended Search Report issued in European Patent Application No. 18916678.8.
Aug. 7, 2018 International Search Report issued in International Patent Application No. PCT/JP2018/017109.

* cited by examiner

<Softening step>

<Shaping step>

<Fusion-cutting step>

<Shaping step>

<Fusion-cutting step>

PRODUCTION METHOD AND PRODUCTION DEVICE FOR THREE-DIMENSIONAL DECORATIVE PIECE MADE OF THERMOPLASTIC SYNTHETIC RESIN

TECHNICAL FIELD

The present invention relates to a method and a device for producing a three-dimensional decorative piece made of a thermoplastic synthetic resin, such as an emblem to be attached to a car, a motorbike, a boat, a household electrical appliance, a game console, clothes, a bag, a cap, or the like, and more specifically relates to a method and a device with which a bulky three-dimensional decorative piece made of a thermoplastic synthetic resin can be produced.

BACKGROUND ART

Three-dimensional decorative pieces made of a thermoplastic synthetic resin (hereinafter referred to simply as "decorative pieces", if appropriate), such as emblems, appliques, and stickers, produced through high-frequency dielectric heating have been proposed (see Patent Document 1, for example).

A decorative piece is produced from a decorative piece material that includes a thermoplastic resin sheet, a vapor-deposited metal layer, a foamed resin sheet, and the like. For example, according to Patent Document 1, while a decorative piece material is sandwiched between an engraved die and a flat-plate die, high-frequency dielectric heating is performed, thereby shaping the decorative piece material while heating and welding the material. The engraved die is provided with fusion-cutting blades along outlines of a design of a decorative piece to be produced, so that fusion-cutting can be performed simultaneously with shaping.

CITATION LIST

Patent Document

[Patent Document 1] Japanese Patent No. 3235943

SUMMARY OF INVENTION

Technical Problem

In order to produce a decorative piece, it is necessary to soften, shape, and weld a decorative piece material by heating the decorative piece material through high-frequency dielectric heating. However, high-frequency dielectric heating has the property of radio waves being focused on a cutting edge, or a corner portion of a design. Accordingly, if the thickness of a decorative piece material is increased, it is no longer possible for the entire decorative piece material to be heated, and shaping and welding cannot be satisfactorily performed. For this reason, the thickness of decorative pieces that can be produced has been limited to up to about 2 mm.

On the other hand, there is demand for bulky decorative pieces that have an enhanced three-dimensional appearance and an enhanced sense of luxuriousness.

An object of the present invention is to provide a method and a device with which a bulky decorative piece made of a thermoplastic synthetic resin can be produced.

Solution to Problem

A method for producing a three-dimensional decorative piece made of a thermoplastic synthetic resin according to the present invention includes:

a step of preparing a decorative piece material including an upper layer that has a thermoplastic synthetic resin film and a lower layer that has a thermoplastic synthetic resin sheet;

a step of disposing the decorative piece material on a flat-plate die serving as an electrode; and a softening step of softening and welding the decorative piece material by bringing a flat-plate die serving as another electrode closer to the flat-plate die serving as the electrode, and performing high-frequency dielectric heating while pressing the decorative piece material.

The Method can Include:

after the softening step, a step of disposing the decorative piece material on a flat-plate die serving as an electrode such that the lower layer side of the decorative piece material abuts against the flat-plate die;

a shaping step of shaping the decorative piece material by bringing an engraved die, the engraved die serving as an electrode and having a recess of a design to be formed in the decorative piece material, closer to the flat-plate die on which the decorative piece material is disposed, and performing high-frequency dielectric heating while pressing the decorative piece material;

a step of disposing a piece of release paper on the lower layer of the decorative piece material via a piece of double-sided tape or a thermal bonding film and disposing the decorative piece material on a flat-plate die serving as an electrode such that the release paper abuts against the flat-plate die; and a fusion-cutting step of bringing a fusion-cutting blade die closer to the flat-plate die, the fusion-cutting blade die serving as an electrode and having a recess of the design to be formed in the decorative piece material and a fusion-cutting blade provided along an outline of the design, and performing high-frequency dielectric heating while pressing the decorative piece material, to thereby fusion-cut the decorative piece material using the fusion-cutting blade.

The Method can Include:

after the softening step, a step of disposing a piece of release paper on the lower layer of the decorative piece material via a piece of double-sided tape or a thermal bonding film and disposing the decorative piece material on a flat-plate die serving as an electrode such that the release paper abuts against the flat-plate die; and a shaping and fusion-cutting step of bringing an engraved die with a fusion-cutting blade closer to the flat-plate die, the engraved die serving as an electrode and having a recess of a design to be formed in the decorative piece material and a fusion-cutting blade provided along an outline of the design, and performing high-frequency dielectric heating while pressing the decorative piece material, to thereby shape the decorative piece material and fusion-cut the decorative piece material using the fusion-cutting blade.

The Method can Include:

after the softening step, a step of disposing the decorative piece material on a flat-plate die serving as an electrode such that the lower layer of the decorative piece material abuts against the flat-plate die;

a shaping step of shaping the decorative piece material by bringing an engraved die with a fusion-cutting blade, the engraved die serving as an electrode and having a recess of a design to be formed in the decorative piece material and a fusion bonding blade provided along an outline of the design, closer to the flat-plate die, and performing high-frequency dielectric heating while pressing the decorative piece material to such an extent that the decorative piece material is not fusion-cut; and a fusion-cutting step of, in a state in which the decorative piece material is held on the engraved die with the fusion-cutting blade, disposing a piece of release paper on the lower layer of the decorative piece material via a piece of double-sided tape or a thermal bonding film, bringing the engraved die with the fusion-cutting blade closer to a flat-plate die with a cushioning material, the flat-plate die serving as an electrode and having a recess formed at a position corresponding to the design and a cushioning material arranged in the recess, closere to the engraved die with the fusion-cutting blade, and performing high-frequency dielectric heating while pressing the decorative piece material, to thereby attach the decorative piece to the double-sided tape or weld the decorative piece material to the thermal bonding film and fusion-cut the decorative piece material using the fusion-cutting blade.

The Method can Include:

after the fusion-cutting step or the shaping and fusion-cutting step, a step of removing the decorative piece material, eliminating an unnecessary portion, and then attaching an application film for holding the separated design in position to the upper layer side of the decorative piece material.

Moreover, a device for producing a three-dimensional decorative piece made of a thermoplastic synthetic resin according to the present invention is a device for producing a decorative piece made of a thermoplastic synthetic resin by shaping a decorative piece material including an upper layer that has a thermoplastic synthetic resin film and a lower layer that has a thermoplastic synthetic resin sheet through high-frequency dielectric heating and fusion-cutting the decorative piece material using a fusion-cutting blade, the device including:

a first jig having a first frame that includes a pair of parallel first guide members, a first slide plate that is slidably disposed on the first guide members, and a first high-frequency dielectric heating device that is disposed on a transfer path of the first slide plate and applies high-frequency dielectric heating to the first slide plate; and a second jig having a second frame that includes a pair of parallel second guide members, a second slide plate that is slidably disposed on the second guide members, and a second high-frequency dielectric heating device that is disposed on a transfer path of the second slide plate and applies high-frequency dielectric heating to the second slide plate, wherein, in the first jig and the second jig, the first slide plate and the second slide plate are slidable in the same direction, the first high-frequency dielectric heating device and the second high-frequency dielectric heating device are arranged so as to oppose each other with the first slide plate and the second slide plate located therebetween, a first flat-plate die that is flat and a first engraved die with a fusion-cutting blade, the first engraved die having a recess of a design to be formed in the decorative piece material and a fusion-cutting blade along an outline of the design, are fastened to a surface of the first slide plate that opposes the second slide plate such that the first flat-plate die and the first engraved die are arranged side-by-side in a slide direction, and a second flat-plate die that is flat and a second engraved die, the second engraved die having a recess of the design to be formed in the decorative piece material, are fastened to a surface of the second slide plate that opposes the first slide plate such that the second flat-plate die and the second engraved die are arranged side-by-side in the slide direction.

Moreover, a device for producing a three-dimensional decorative piece made of a thermoplastic synthetic resin according to the present invention is a device for producing a decorative piece made of a thermoplastic synthetic resin by shaping a decorative piece material including an upper layer that has a thermoplastic synthetic resin film and a lower layer that has a thermoplastic synthetic resin sheet through high-frequency dielectric heating and fusion-cutting the decorative piece material using a fusion-cutting blade, the device including:

a first jig having a first frame, a first flat-plate die mounted on the first frame, and a first high-frequency dielectric heating device that applies high-frequency dielectric heating to the first flat-plate die; and a second jig having a second frame that includes a pair of parallel second guide members, a second slide plate that is slidably disposed on the second guide members, and a second high-frequency dielectric heating device that is disposed on a transfer path of the second slide plate and applies high-frequency dielectric heating to the second slide plate, wherein the first high-frequency dielectric heating device and the second high-frequency dielectric heating device are arranged so as to oppose each other with the first flat-plate die and the second slide plate located therebetween, and a second flat-plate die that is flat and a second engraved die with a fusion-cutting blade, the second engraved die having a recess of a design to be formed in the decorative piece material and a fusion-cutting blade along an outline of the design, are fastened to a surface of the second slide plate that opposes the first flat-plate die such that the second flat-plate die and the second engraved die are arranged side-by-side in the slide direction.

Moreover, a device for producing a three-dimensional decorative piece made of a thermoplastic synthetic resin according to the present invention is a device for producing a decorative piece made of a thermoplastic synthetic resin by shaping a decorative piece material including an upper layer that has a thermoplastic synthetic resin film and a lower layer that has a thermoplastic synthetic resin sheet through high-frequency dielectric heating and fusion-cutting the decorative piece material using a fusion-cutting blade, the device including:

a first jig having a first frame that includes a pair of parallel first guide members, a first slide plate that is slidably disposed on the first guide members, and a first high-frequency dielectric heating device that is disposed on a transfer path of the first slide plate and applies high-frequency dielectric heating to the first slide plate; and a second jig having a second frame that includes a pair of parallel second guide members, a second slide plate that is slidably disposed on the second guide members, and a second high-frequency dielectric heating device that is disposed on a transfer path of the second slide plate and applies high-frequency dielectric heating to the second slide plate, wherein, in the first jig and the second jig, the first slide plate and the second slide plate are slidable in the same direction, the first high-frequency dielectric heating device and the second high-frequency dielectric heating device are arranged so as to oppose each other with the first slide plate and the second slide plate located therebetween, a first flat-plate die that is flat and a recessed die with a cushioning material, the recessed die having a recess at a position corresponding to a design to be formed in the decorative piece material and a cushioning material fitted in the recess, are fastened to a surface of the first slide plate that opposes the second slide plate such that the first flat-plate die and the recessed die are arranged side-by-side in a slide direction, and a second flat-plate die that is flat and a second engraved die with a fusion-cutting blade, the second engraved die having a recess of the design to be formed in the decorative piece material and a fusion-cutting blade formed along an outline of the design, are fastened to a surface of the second slide plate that opposes the first slide plate such that the second flat-plate die and the second engraved die are arranged side-by-side in the slide direction.

Effects of the Invention

With the method for producing a three-dimensional decorative piece made of a thermoplastic synthetic resin according to the present invention, the entire decorative piece material can be heated and softened by performing high-frequency dielectric heating on the decorative piece material using the flat-plate dies. Since the entire decorative piece material is heated and softened through high-frequency dielectric heating prior to the shaping, the decorative piece material can be shaped using the engraved die in the subsequent shaping step even when the decorative piece material is thick, and thus, a bulky three-dimensional decorative piece made of a thermoplastic synthetic resin that has a three-dimensional appearance and a sense of luxuriousness can be favorably produced.

Moreover, with the device for producing a three-dimensional decorative piece made of a thermoplastic synthetic resin according to the present invention, it is possible to shape the decorative piece material using the engraved die and/or the engraved die with the fusion-cutting blade immediately after softening the decorative piece material using the flat-plate die, by sliding the dies after the softening.

DESCRIPTION OF EMBODIMENTS

Figure 1:
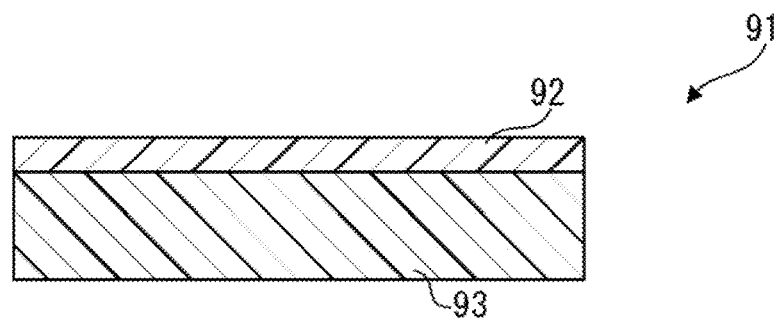
FIG. 1 is a cross-sectional view of a decorative piece material according to an embodiment of the present invention.

Hereinafter, a three-dimensional decorative piece 90 made of a thermoplastic synthetic resin of the present invention and a method for producing the three-dimensional decorative piece 90 will be described with reference to the drawings. Note that, in the drawings, the thicknesses of the decorative piece 90 and layers of a decorative piece material 91, projections and recesses of dies, the thicknesses of the dies, and the like are shown exaggerated to facilitate the explanation. Also, the shapes, the designs, and the like of the decorative piece 90 and the decorative piece material 91 are given by way of example only, and can be changed as appropriate.

FIG. 1 is a cross-sectional view of the decorative piece material 91. As shown in FIG. 1, the decorative piece material 91 includes an upper layer 92 and a lower layer 93.

The upper layer 92 is a laminated film including a thermoplastic synthetic resin film that can be molded through high-frequency dielectric heating, a vapor-deposited metal layer, and the like. The thermoplastic synthetic resin film may be made of a soft thermoplastic synthetic resin, such as polyvinyl chloride or polyurethane, for example. The upper layer 92 can be formed by, for example, forming the vapor-deposited metal layer on the thermoplastic synthetic resin film that is located on the upper surface side through metal vapor deposition. Note that the upper layer 92 may also have a configuration in which a migration preventing film is provided on a lower surface of the vapor-deposited metal layer via an adhesive layer, if necessary, and furthermore a thermoplastic synthetic resin film may be provided thereunder via an adhesive layer.

An example of the migration preventing film is an ethylene-vinyl alcohol copolymer (EVOH) film. The migration preventing film prevents a dye of a garment or the like to which the decorative piece 90 is attached from migrating to a front surface side of the decorative piece material 91.

A desired design can also be printed in a desired color onto an upper surface of the upper layer 92 using a transparent color ink, a matte ink, a glossy ink, or the like. Furthermore, a fine line design can also be added by screen printing an ultraviolet-curable transparent UV ink or the like onto the above-described printing, so that a sense of luxuriousness such as that of braided embroidery, an aura of substance, elaborateness, a depth of color, and a metallic appearance, and furthermore, minute projections and depressions, and the like can also be expressed.

A soft sheet of a thermoplastic synthetic resin or a foamed resin sheet can be used as the lower layer 93, and the lower layer 93 may be made of a thermoplastic synthetic resin, such as soft polyvinyl chloride (PVC), for example.

In the present invention, a material in which a foamed resin sheet or the like is thicker than that of a conventional material can be used as the decorative piece material 91. For example, the decorative piece material 91 may have a total thickness of greater than 2 mm, and the shaping of a decorative piece material having such a thickness has been difficult with a conventional method. The decorative piece material 91 has a thickness of preferably about 2.3 mm to 6 mm, but the present invention is also applicable to a decorative piece material having a greater thickness.

A feature of the present invention is that the decorative piece material 91 is softened through high-frequency dielectric heating in advance, and then high-frequency dielectric heating is performed again to thereby perform shaping and fusion-cutting.

Softening Step

Figure 2:
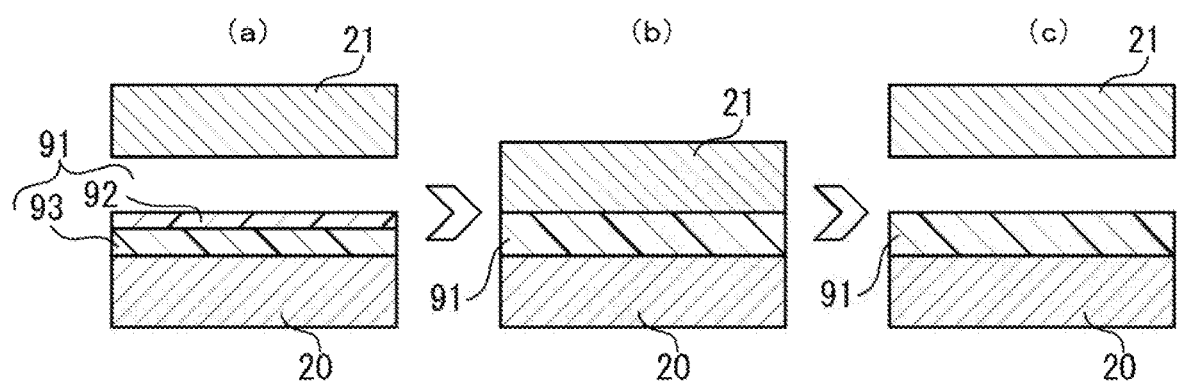
FIG. 2 is an explanatory diagram illustrating a softening step of the present invention.

As illustrated in FIG. 2, the step of softening the decorative piece material 91 can be performed by performing high-frequency dielectric heating while the decorative piece material 91 is sandwiched between a first flat-plate die 20 and a second flat-plate die 21, which serve as electrodes. Specifically, the decorative piece material 91 is placed on top of the first flat-plate die 20 as illustrated in FIG. 2(a), the second flat-plate die 21 is brought closer to the first flat-plate die 20 as illustrated in FIG. 2(b), and high-frequency dielectric heating is performed. Thus, insulators of the upper layer 92 and the lower layer 93 of the decorative piece material 91 generate heat and fuse, allowing both layers to be softened in their entirety and welded to each other. After the high-frequency dielectric heating, the second flat-plate die 21 is separated from the decorative piece material 91 as illustrated in FIG. 2(c).

First Embodiment

According to a first embodiment, after the softening step, the decorative piece material 91 is shaped as illustrated in FIGS. 3(a) to 3(c) (shaping step), and subsequently the shaped decorative piece material 91 is fusion-cut as illustrated in FIGS. 3(d) to 3(f) (fusion-cutting step).

In the shaping step, as illustrated in FIG. 3(a), the first flat-plate die 20 is used, and an engraved die 22 is used in place of the second flat-plate die 21 in FIG. 2. As illustrated in FIG. 3(a), the engraved die 22 is a die in which recesses 23 of a design to be formed in the decorative piece material 91 are formed. While the decorative piece material 91 that is in a softened state due to the softening step is still placed on top of the first flat-plate die 20, the engraved die 22 is brought closer to the first flat-plate die 20 as illustrated in FIG. 3(b), and high-frequency dielectric heating is performed. Thus, the decorative piece material 91 is shaped in conformity with the recesses 23 of the engraved die 22 as illustrated in FIG. 3(c). In the shaping step, since the decorative piece material 91 that is softened in its entirety in advance is shaped, the shaping can be performed even when the decorative piece material 91 is thick. Note that, after the shaping, the decorative piece material 91 is cooled to fix its shape.

After the shaping step, the decorative piece material 91 is fusion-cut along the design. In the fusion-cutting step, first, as illustrated in FIG. 3(d), the decorative piece material 91 with a piece of release paper 95 disposed on or attached to the lower layer 93 side thereof via a piece of double-sided tape 94 is placed on top of the first flat-plate die 20. The double-sided tape 94 is used to attach the produced decorative piece 90 to various products and the like.

Figure 3:
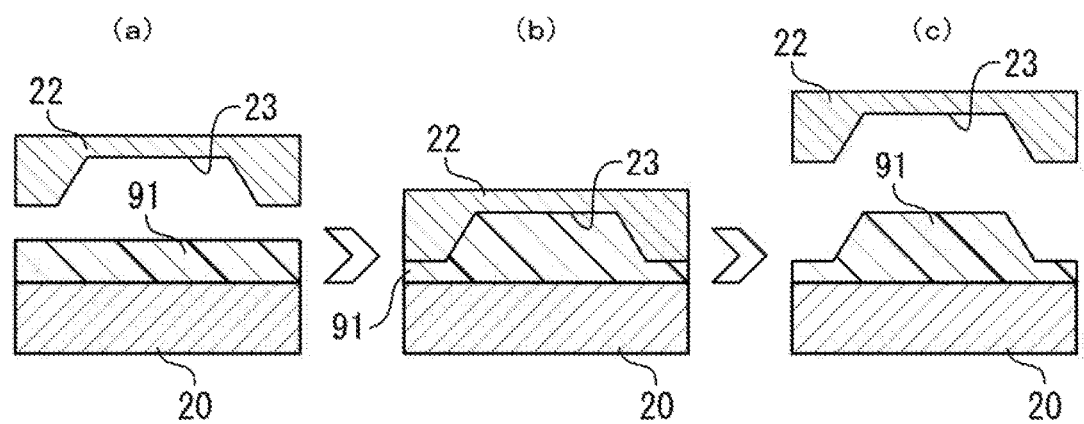
FIG. 3 is an explanatory diagram illustrating a shaping step and a fusion-cutting step according to a first embodiment of the present invention.
Figure 3:
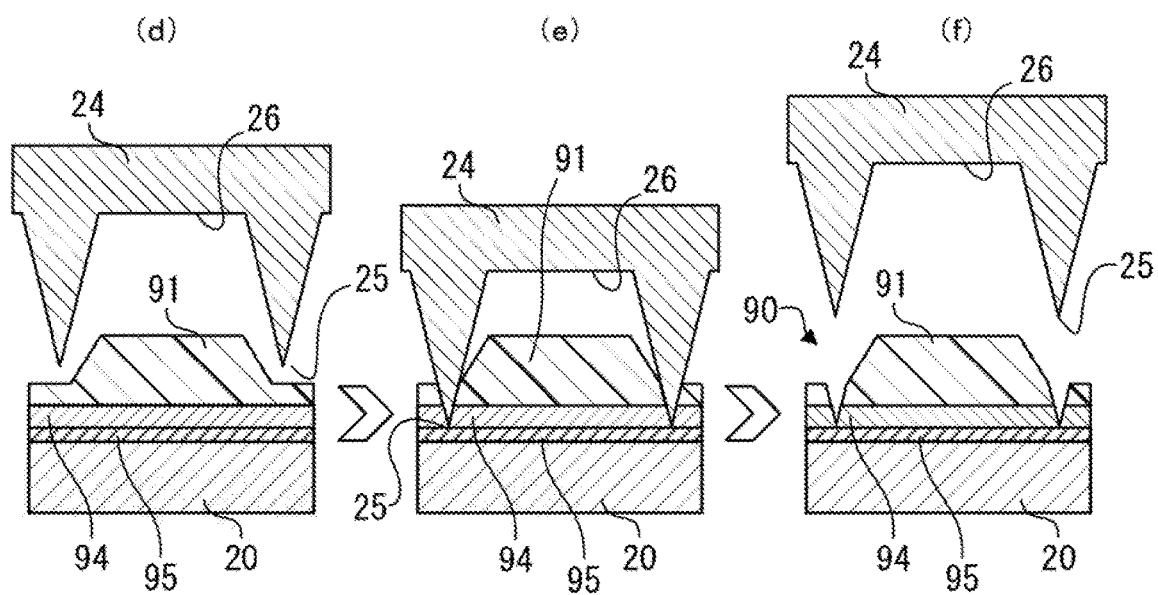

In the fusion-cutting step, as also illustrated in FIG. 3(d), an engraved die 24 with fusion-cuttings blade is used in place of the engraved die 22. The engraved die 24 with the fusion-cutting blades is a die in which fusion-cutting blades 25 are formed at peripheral edges of recesses 26 along outlines of the design to be formed in the decorative piece material 91. If the fusion-cutting blades 25 come into surface contact with the decorative piece material 91 that has been shaped using the engraved die 22, the dielectric heating efficiency decreases, resulting in a deformation or the like of the already shaped decorative piece material 91. For this reason, it is desirable that, as illustrated in FIG. 3, the fusion-cutting blades 25 have a sharper angle than the engraved die 22 so as not to come into surface contact with the decorative piece material 91. In a state in which the decorative piece material 91 that has been shaped through the shaping step is placed on top of the first flat-plate die 20, with the double-sided tape 94 and the release paper 95 disposed on or attached to the decorative piece material 91, the engraved die 24 with the fusion-cutting blades is brought closer to the first flat-plate die 20 as illustrated in FIG. 3(e), and high-frequency dielectric heating is performed. Thus, the decorative piece material 91 and the double-sided tape 94 are fusion-cut or cut by the fusion-cutting blades 25 as illustrated in FIG. 3(f). The release paper 95 is not cut by the fusion-cutting blades 25.

As a result of the above-described fusion-cutting step, the shaped and fusion-cut design and unnecessary portions of the decorative piece material 91 remain on the release paper 95 in a state in which the design and the unnecessary portions are separately attached to the double-sided tape 94. After that, the unnecessary portions are eliminated, and an application film is attached to the upper layer 92 side of the decorative piece material 91 so as to prevent displacement of the design. Thus, a decorative piece 90 can be obtained. Examples of the application film include, but are not limited to, sheets in which an acrylic pressure-sensitive adhesive is applied to a polyester film or paper.

The obtained decorative piece 90 can be affixed to a product by peeling off the release paper 95 and attaching the decorative piece 90 to the product via the double-sided tape 94 in a state in which the application film or the like is attached to the decorative piece 90, and then peeling off the application film or the like.

According to the first embodiment of the present invention, a decorative piece 90 can be produced by performing the shaping step and the fusion-cutting step by replacing the dies after the softening step.

As described above, replacement of the dies is needed when producing the decorative piece 90. Hereinafter, a production device 10 with which a decorative piece 90 can be produced by favorably replacing the dies will be described.

Production Device of First Embodiment

Figure 4:
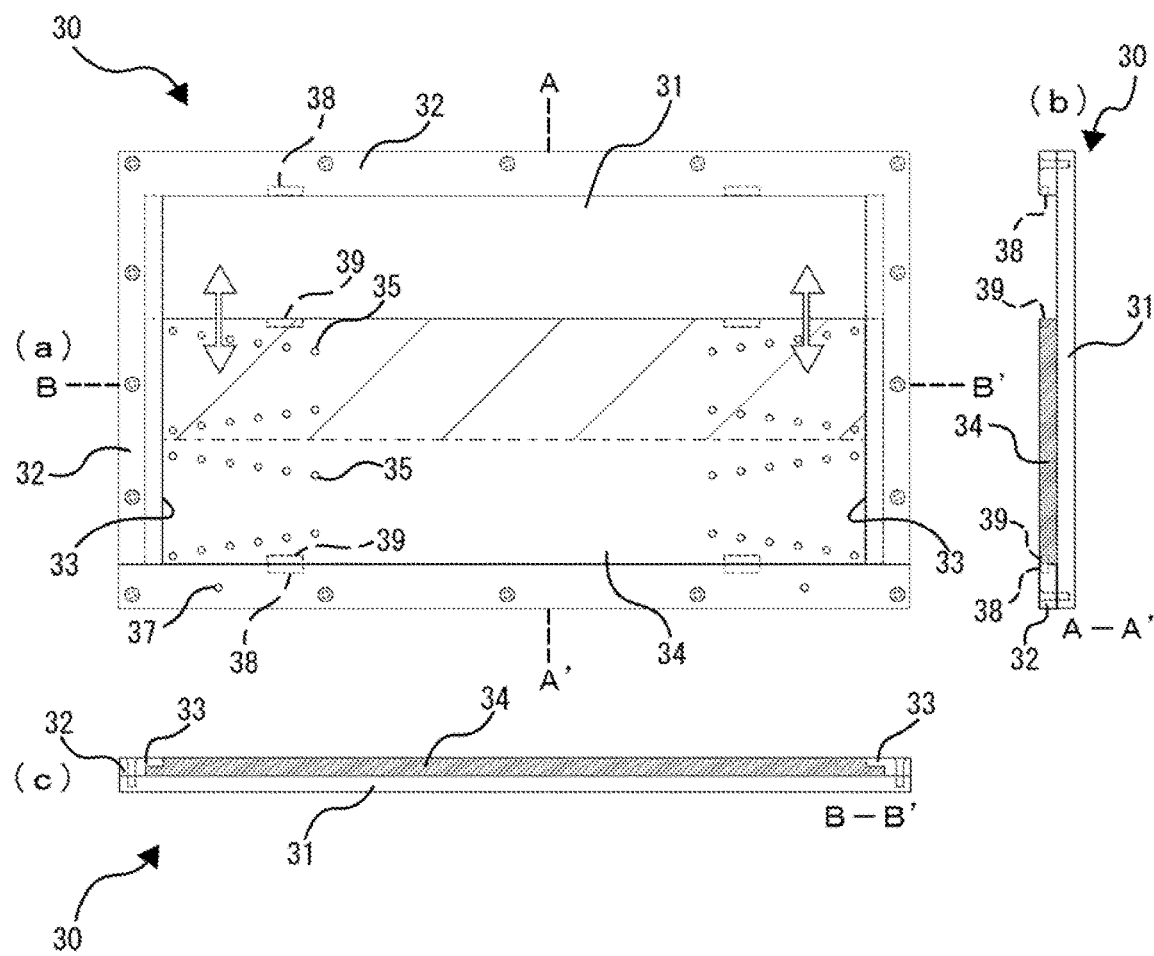
FIG. 4 shows (a) a plan view, (b) a vertical cross-sectional view, and (c) a horizontal cross-sectional view of a first jig that is used in the first embodiment of the present invention.
Figure 5:
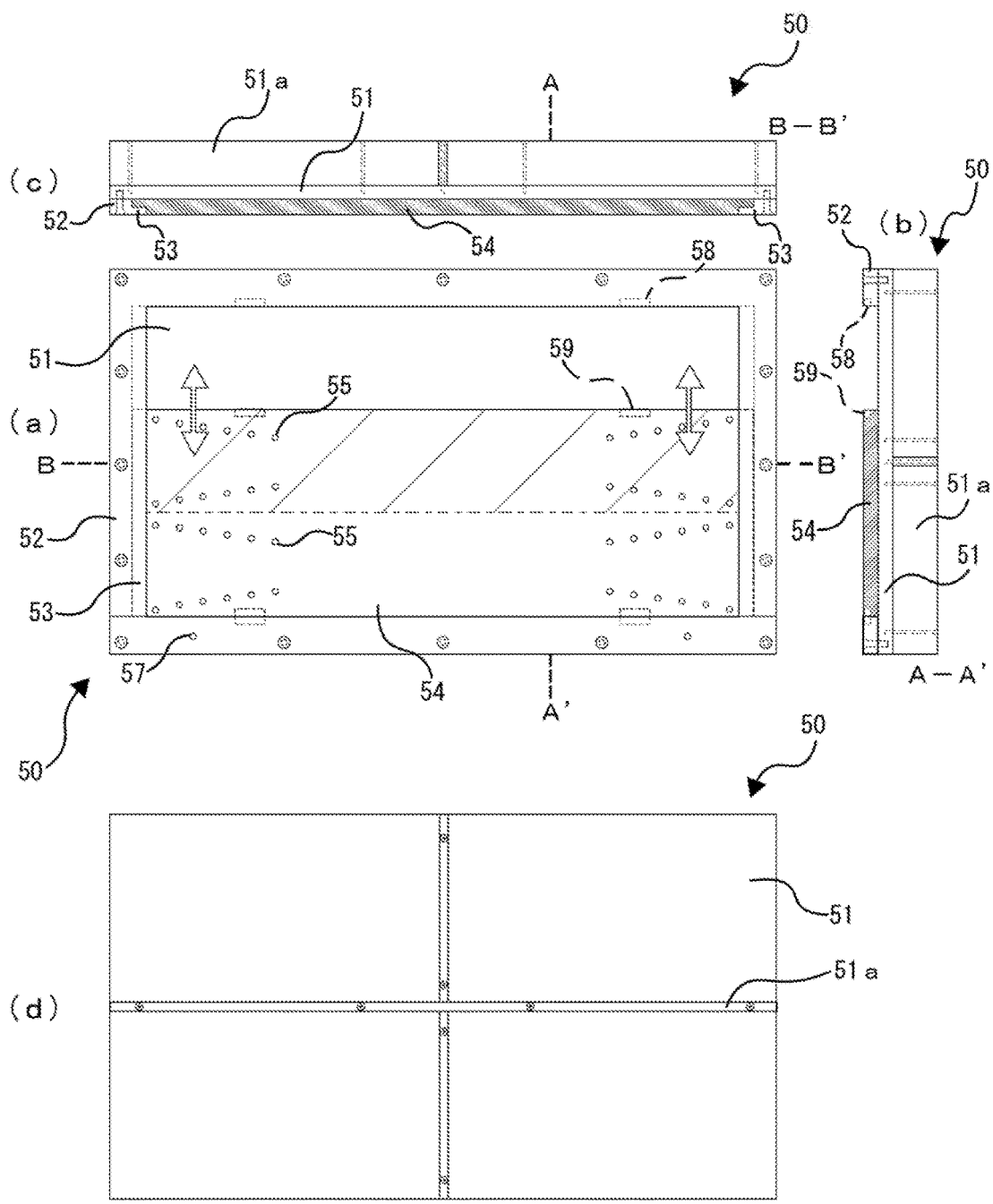
FIG. 5 shows (a) a bottom view, (b) a vertical cross-sectional view, (c) a horizontal cross-sectional view, and (d) a plan view of a second jig that is used in the first embodiment of the present invention.
Figure 10:
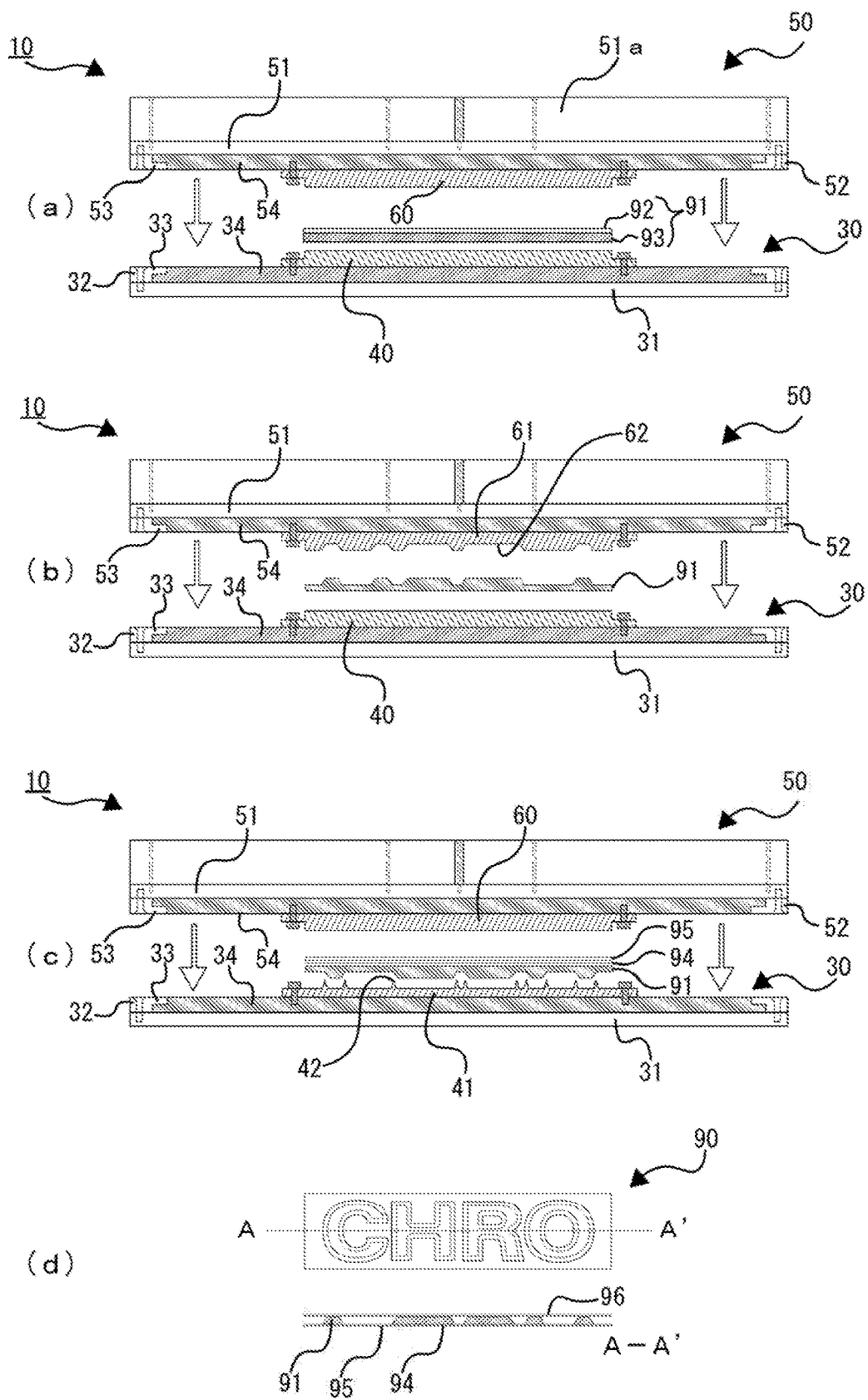
FIG. 10 is an explanatory diagram of a production method that uses a production device of the first embodiment of the present invention.

FIGS. 4 and 5 show an example of the production device 10 that can be used in the present embodiment. The production device 10 may be constituted by a first jig 30 shown in FIG. 4 and a second jig 50 shown in FIG. 5. The first jig 30 and the second jig 50 constitute the production device 10 in which, as shown in FIG. 10, which will be described later, the first jig 30 is arranged on the lower side and the second jig 50 is arranged on the upper side.

In the first jig 30, as shown in FIG. 4, a rectangular first frame 32 is mounted on an upper surface of a rectangular bottom plate 31. As shown in FIG. 4(*c*), the first frame 32 includes first guide members 33 on an inner surface side thereof in a left-right direction, which is a width direction, the first guide members 33 extending parallel to each other.

A first slide plate 34 is slidably engaged with the first guide members 33. The first slide plate 34 has a length that is ⅔ of the length of the first frame 32 (first guide members 33). A plurality of tapped holes 35 to which a die, which will be described later, is to be fastened are formed in the first slide plate 34, and two dies can be mounted on the first slide plate 34 in a length direction.

Also, pin holes 37 for achieving alignment with the second jig 50 are formed at a plurality of locations in the first frame 32.

Means for preventing displacement such as magnets 38 and 39 are arranged in end faces in the length direction of the first frame 32 and the first slide plate 34, and when the first slide plate 34 is slid and abutted against the first frame 32, the magnets 38 and 39 are attracted to each other, thereby restraining the first slide plate 34 from moving freely.

The first jig 30 is configured such that one wire (lower board) of a high-frequency molding machine, which is not shown, can be connected to the center of a lower surface of the bottom plate 31, and high-frequency dielectric heating is applied to a portion indicated by the oblique lines in FIG. 4. The region that is subjected to the high-frequency dielectric heating is a region that occupies ½ of the first slide plate 34 in the length direction and ⅓ of the first frame 32 in the length direction and is located centrally in the length direction of the first frame 32.

Therefore, the first jig 30 is configured such that, when the first slide plate 34 is slid in a direction indicated by the arrows in FIG. 4(*a*), the first slide plate 34 can be slid to the front side, which is the lower side in the paper plane, as shown in FIGS. 4(*a*) and 4(*b*) and positioned by the magnets 38 and 39 attracting each other. Moreover, in the case where the first slide plate 34 is slid to the back side, which is the upper side in the paper plane, as well, the first slide plate 34 can be positioned by the magnets 38 and 39 attracting each other.

In the second jig 50, as shown in FIG. 5, a rectangular second frame 52 is mounted on a lower surface of a rectangular top plate 51. The second frame 52 includes second guide members 53 on an inner surface side thereof in the left-right direction, which is the width direction, the second guide members 53 extending parallel to each other. The second guide members 53 are formed so as to extend in the same direction as the first guide members 33.

A second slide plate 54 is slidably engaged with the second guide members 53. The second slide plate 54 has a length that is ⅔ of the length of the second frame 52 (second guide members 53). A plurality of tapped holes 55 to which a die, which will be described later, is to be fastened are formed in the second slide plate 54, and two dies can be mounted on the second slide plate 54 in the length direction.

Also, pin holes 57 for achieving alignment with the first jig 30 are formed at a plurality of locations in the second frame 52.

Means for preventing displacement such as magnets 58 and 59 are arranged in end faces in the length direction of the second frame 52 and the second slide plate 54, and when the second slide plate 54 is slid and abutted against the second frame 52, the magnets 58 and 59 are attracted to each other, thereby restraining the second slide plate 54 from moving freely.

In the second jig 50, a cross-shaped bar 51*a* in which a plurality of screw holes are formed is mounted on an upper surface of the top plate 51, so that the second jig 50 can be fastened to an upper board (not shown) of the high-frequency molding machine, which is not shown, using a bolt or the like. In the second jig 50, high-frequency dielectric heating is performed on a portion indicated by the oblique lines in FIG. 5. The region that is subjected to the high-frequency dielectric heating is a region that occupies ½ of the second slide plate 54 in the length direction and ⅓ of the second frame 52 in the length direction and is located centrally in the length direction of the second frame 52. This region opposes the high-frequency dielectric heating region of the first jig 30 shown in FIG. 4.

Therefore, the second jig 50 is configured such that, when the second slide plate 54 is slid in a direction indicated by the arrows in FIG. 5(*a*), the second slide plate 54 can be slid to the back side, which is the lower side in the paper plane, as shown in FIGS. 5(*a*) and 5(*b*), and positioned by the magnets 58 and 59 attracting each other. Moreover, in the case where the second slide plate 54 is slid to the front side, which is the upper side in the paper plane, as well, the second slide plate 54 can be positioned by the magnets 58 and 59 attracting each other.

In the first jig 30 and the second jig 50 described above, dies are mounted on the first slide plate 34 and the second slide plate 54.

Figure 6:
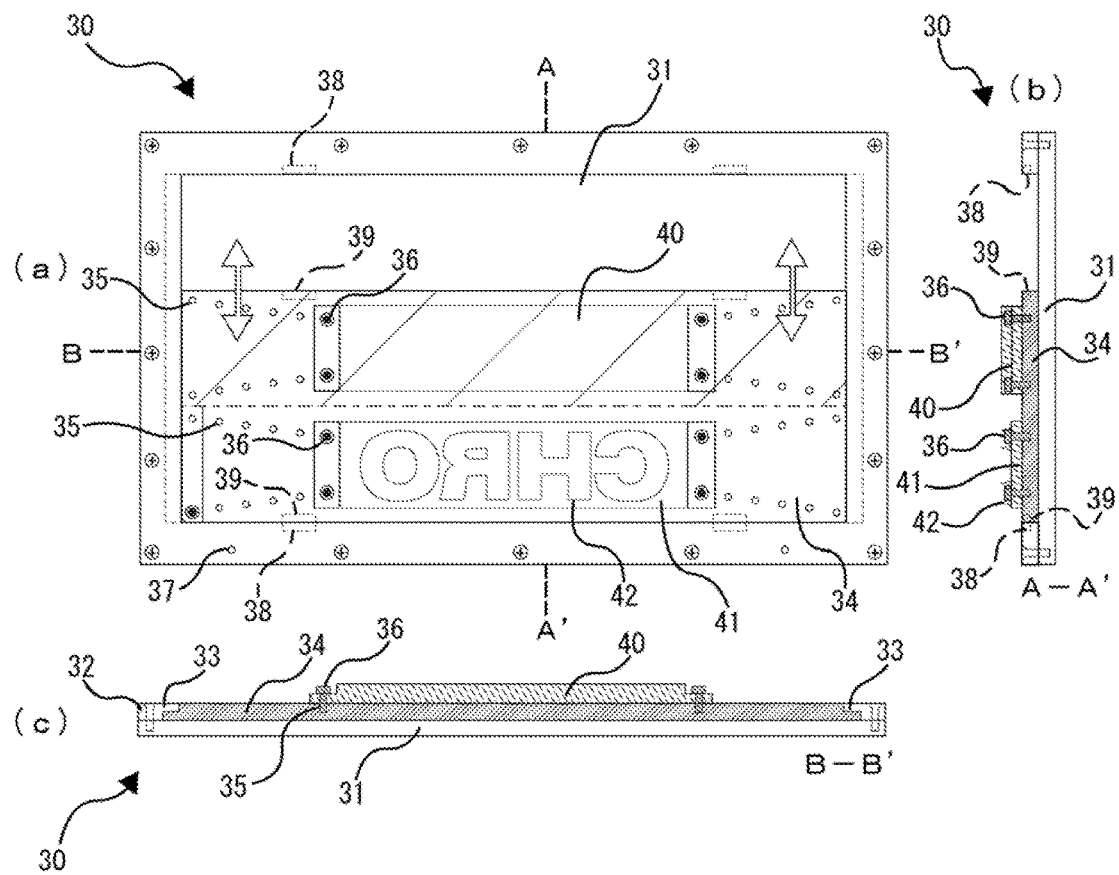
FIG. 6 shows (a) a plan view, (b) a vertical cross-sectional view, and (c) a horizontal cross-sectional view of the first jig in FIG. 4 in a state in which dies are fastened to the first jig.
Figure 7:
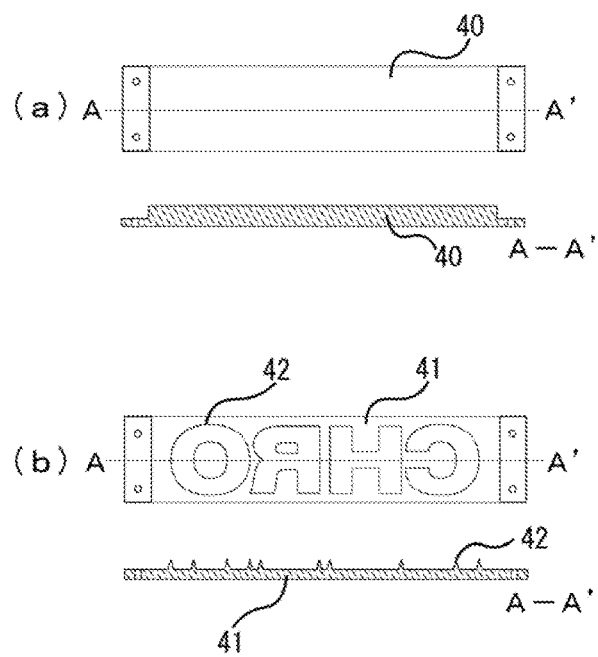
FIG. 7 shows plan views and cross-sectional views of (a) a flat-plate die and (b) an engraved die with fusion-cutting blades that are to be fastened to the first jig.

FIG. 6 shows the first jig 30 to which dies 40 and 41 are mounted, and FIG. 7 shows the dies 40 and 41 that are to be mounted to the first jig 30. The dies 40 and 41 can be mounted on the first slide plate 34 by fastening screws 36 to the tapped holes 35. The dies to be fastened to the first jig 30 may be the first flat-plate die 40 shown in FIG. 7(*a*) and the first engraved die 41 with fusion-cutting blades shown in FIG. 7(*b*). The first flat-plate die 40 is a die that has a flat upper surface, and the first engraved die 41 with the fusion-cutting blades is a die in which fusion-cutting blades 42 are formed along the outlines of the design of the decorative piece material 91.

Figure 8:
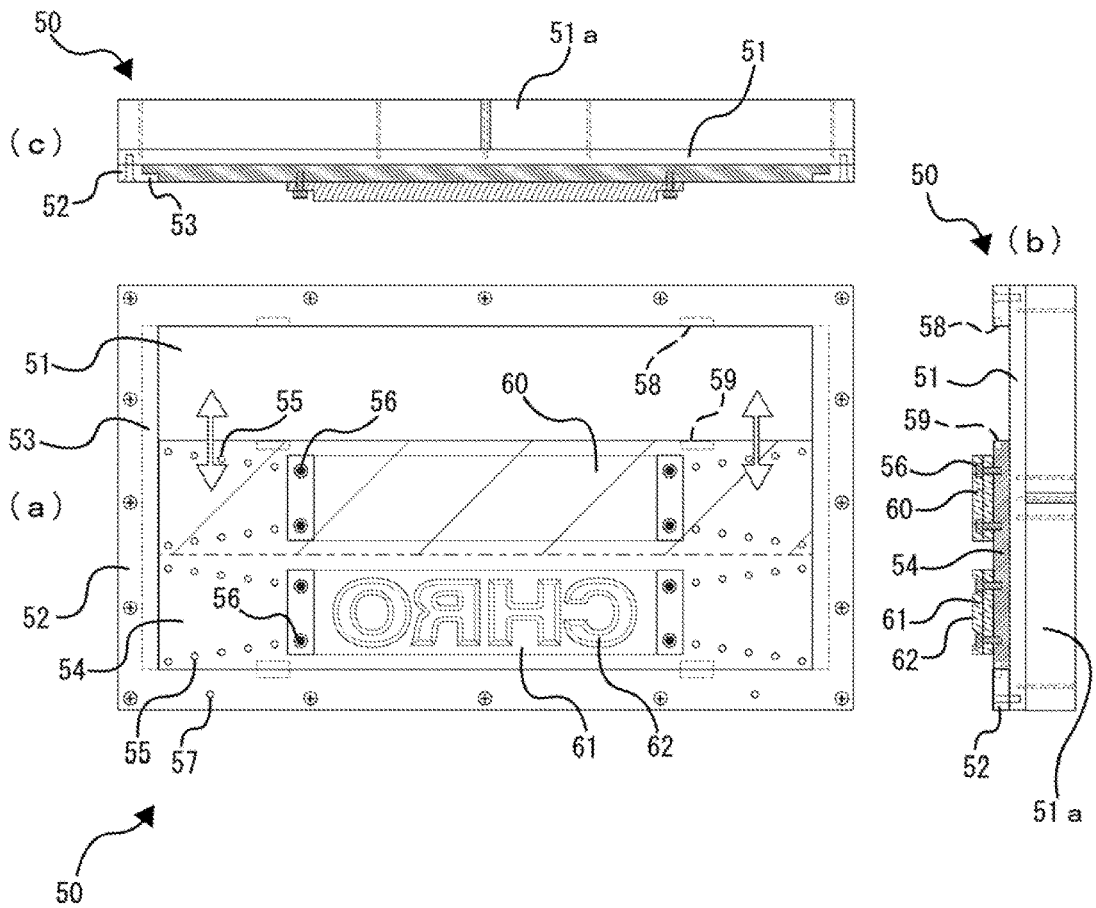
FIG. 8 shows (a) a bottom view, (b) a vertical cross-sectional view, and (c) a horizontal cross-sectional view of the second jig in FIG. 5 in a state in which dies are fastened to the second jig.
Figure 9:
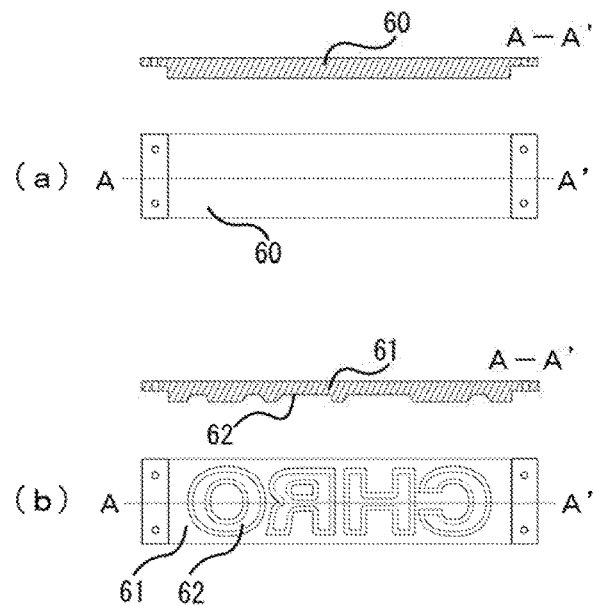
FIG. 9 shows plan views and cross-sectional views of (a) a flat-plate die and (b) an engraved die that are to be fastened to the second jig.

FIG. 8 shows the second jig 50 to which dies 60 and 61 are mounted, and FIG. 9 shows the dies 60 and 61 that are to be mounted to the second jig 50. The dies 60 and 61 can be mounted on the second slide plate 54 by fastening screws 56 to the tapped holes 55. The dies to be fastened to the second jig 50 may be the second flat-plate die 60 shown in FIG. 9(*a*) and the second engraved die 61 shown in FIG. 9(*b*). The second flat-plate die 60 is a die that has a flat lower surface, and the second engraved die 61 is a die in which recesses 62 of the design of the decorative piece material 91 are formed. For example, recesses 62 that constitute inverted alphabet letters "CHRO" are formed in the second engraved die 61 shown in FIG. 9.

Then, the first jig 30 and the second jig 50 on which the dies 40 and 41 and the dies 60 and 61 are respectively mounted are fastened to a high-frequency dielectric heating device, which is not shown, such that the first jig 30 is located on the lower side and the second jig 50 is located on the upper side. In order for the first jig 30 and the second jig 50 to be fastened correctly relative to each other in the vertical direction, the positions of both jigs are adjusted by inserting pins (not shown) into the pin holes 37 and 57.

Then, first, the softening step (see FIG. 2) of softening the decorative piece material 91 is performed using the production device 10. As illustrated in FIG. 10(a), in both the first jig 30 and the second jig 50, the slide plates 34 and 54 are positioned such that the flat-plate dies 40 and 60 are located centrally (in the portions indicated by the oblique lines in FIGS. 6 and 8), and the decorative piece material 91 is placed on top of the first flat-plate die 40. In this state, the second jig 50 is moved downward, and while the decorative piece material 91 is thereby pressed, high-frequency dielectric heating is performed using the flat-plate dies 40 and 60 as electrodes, thereby softening and welding the entire decorative piece material 91. When the softening is completed, the second jig 50 is moved upward.

Subsequently, with the first jig 30 left as it is, the second slide plate 54 of the second jig 50 is slid to the back side, thereby moving the second engraved die 61 to the center (the portion indicated by the oblique lines in FIG. 8) as illustrated in FIG. 10(b). Then, the second jig 50 is moved downward, and while the decorative piece material 91 is thereby pressed, high-frequency dielectric heating is performed using the first flat-plate die 40 and the second engraved die 61 as electrodes (shaping step in FIGS. 3(a) to 3(c)). Since the entire decorative piece material 91 is softened due to the softening step, the decorative piece material 91 is shaped in conformity with the recesses 62 of the second engraved die 61 through high-frequency dielectric heating, and thus the design is formed therein as projections and recesses. When the shaping is completed, the decorative piece material 91 is temporarily cooled to fix the shape.

Next, as illustrated in FIG. 10(c), the first slide plate 34 of the first jig 30 is slid to the back side, thereby moving the first engraved die 41 with the fusion-cutting blades to the center (the portion indicated by the oblique lines in FIG. 6), and the second slide plate 54 of the second jig 50 is slid to the front side, thereby moving the second flat-plate die 60 to the center (the portion indicated by the oblique lines in FIG. 8). Then, the decorative piece material 91 is disposed, with its surface that has served as the lower surface in the shaping step facing upward, such that the shaped design is fitted into the first engraved die 41 with the fusion-cutting blades. The double-sided tape 94 to which the release paper 95 is attached is placed on or attached to the decorative piece material 91 from above such that the release paper 95 is located on the upper side. In this state, the second jig 50 is moved downward, and while the decorative piece material 91 is thereby pressed, high-frequency dielectric heating is performed using the first engraved die 41 with the fusion-cutting blades and the second flat-plate die 60 as electrodes (fusion-cutting step in FIGS. 3(d) to 3(f)). Thus, the decorative piece material 91 and the double-sided tape 94 are fusion-cut along the outlines of the design by the fusion-cutting blades 42. After that, the second jig 50 is moved upward, and the decorative piece material 91 is removed.

Since the removed decorative piece material 91 is attached to the release paper 95 via the double-sided tape 94, the decorative piece material 91 can be removed from the production device 10 without positional displacement occurring. In this state, unnecessary portions are eliminated from the decorative piece material 91, and the application film 96 is attached to a surface of the decorative piece material 91 on the opposite side to the release paper 95. Thus, a decorative piece 90 can be obtained as illustrated in FIG. 10(d).

The obtained decorative piece 90 can be affixed to a product without positional displacement occurring, by peeling off the release paper 95, attaching the decorative piece 90 to the product via the double-sided tape 94, and then peeling off the application film 96.

In the above-described embodiment, the slide plates 34 and 54 are respectively disposed in the first jig 30 and the second jig 50, and different types of dies are fastened to these slide plates 34 and 54. Therefore, replacement of the dies can be achieved simply by sliding the slide plates 34 and 54, and the softening step (FIG. 2), the shaping step (FIGS. 3(a) to 3(c)), and the fusion-cutting step (FIGS. 3(d) to 3(f)) can be performed immediately one after another using the same device.

Moreover, since the softening step allows the entire decorative piece material 91 to be softened in advance even when the decorative piece material 91 is thick, the above-described embodiment is particularly preferable for the production of a bulky decorative piece 90 having a three-dimensional appearance and a sense of luxuriousness. For example, if a decorative piece material 91 that is 2.3 mm to 6 mm thick is used, a decorative piece 90 having a thickness of 2.5 mm to 6.2 mm can be produced.

Second Embodiment

In a second embodiment, after the softening step, shaping and fusion-cutting are performed in one step. Note that, unless otherwise specified, the same reference numerals as those of the first embodiment denote the same or similar members, and a description thereof is omitted as appropriate.

As is the case with the first embodiment, the decorative piece material 91 is subjected to the softening step illustrated in FIG. 2.

Then, the decorative piece material 91 that is softened in its entirety is subjected to a shaping and fusion-cutting step illustrated in FIGS. 11(a) to 11(c). The shaping and fusion-cutting step can be performed by performing high-frequency dielectric heating using the flat-plate die 20 on one hand and the engraved die 24 with the fusion-cutting blades, in which the recesses 26 of the design are formed and the fusion-cutting blades 25 are formed along the outlines of the design, on the other hand. The engraved die 24 with the fusion-cutting blades shown in FIGS. 11(a) to 11(c) is a die in which the recesses 26 are formed to have a depth that is greater than the thickness of a decorative piece 90 to be obtained.

The engraved die 24 with the fusion-cutting blades is used in place of the second flat-plate die 21 used in the softening step (see FIG. 2), and as illustrated in FIG. 11(a), the decorative piece material 91 that is in the softened state due to the softening step is placed on top of the flat-plate die 20, with the release paper 95 disposed on the lower layer 93 side of the decorative piece material 91, or attached to the decorative piece material 91, via the double-sided tape 94. Then, as illustrated in FIG. 11(b), the engraved die 24 with the fusion-cutting blades is brought closer to the flat-plate die 20, and high-frequency dielectric heating is performed. Thus, the decorative piece material 91 is shaped as illustrated in FIG. 11(b). In the present embodiment, since the recesses 26 of the engraved die 24 with the fusion-cutting blades are formed to have a depth that is greater than the thickness of the decorative piece 90, a top portion of the decorative piece 90 is shaped without abutting against a bottom surface of the die. As a result, a decorative piece 90 with a design having a slightly round-shaped curve can be obtained. Moreover, the decorative piece material 91 is fusion-cut or cut together with the double-sided tape 94 by the fusion-cutting blades 25 as illustrated in FIGS. 11(b) and 11(c).

After that, unnecessary portions of the decorative piece material 91 are eliminated, and the application film 96 is attached to the upper layer 92 side of the decorative piece material 91 so as to prevent displacement of the design, and thus, a decorative piece 90 can be obtained.

According to the second embodiment of the present invention, a decorative piece 90 can be produced by performing the shaping and fusion-cutting step by replacing the die after the softening step.

As described above, replacement of the die is needed when producing the decorative piece 90. Hereinafter, a production device 10 with which a decorative piece 90 can be produced by favorably replacing the die will be described.

Production Device of Second Embodiment

Figure 12:
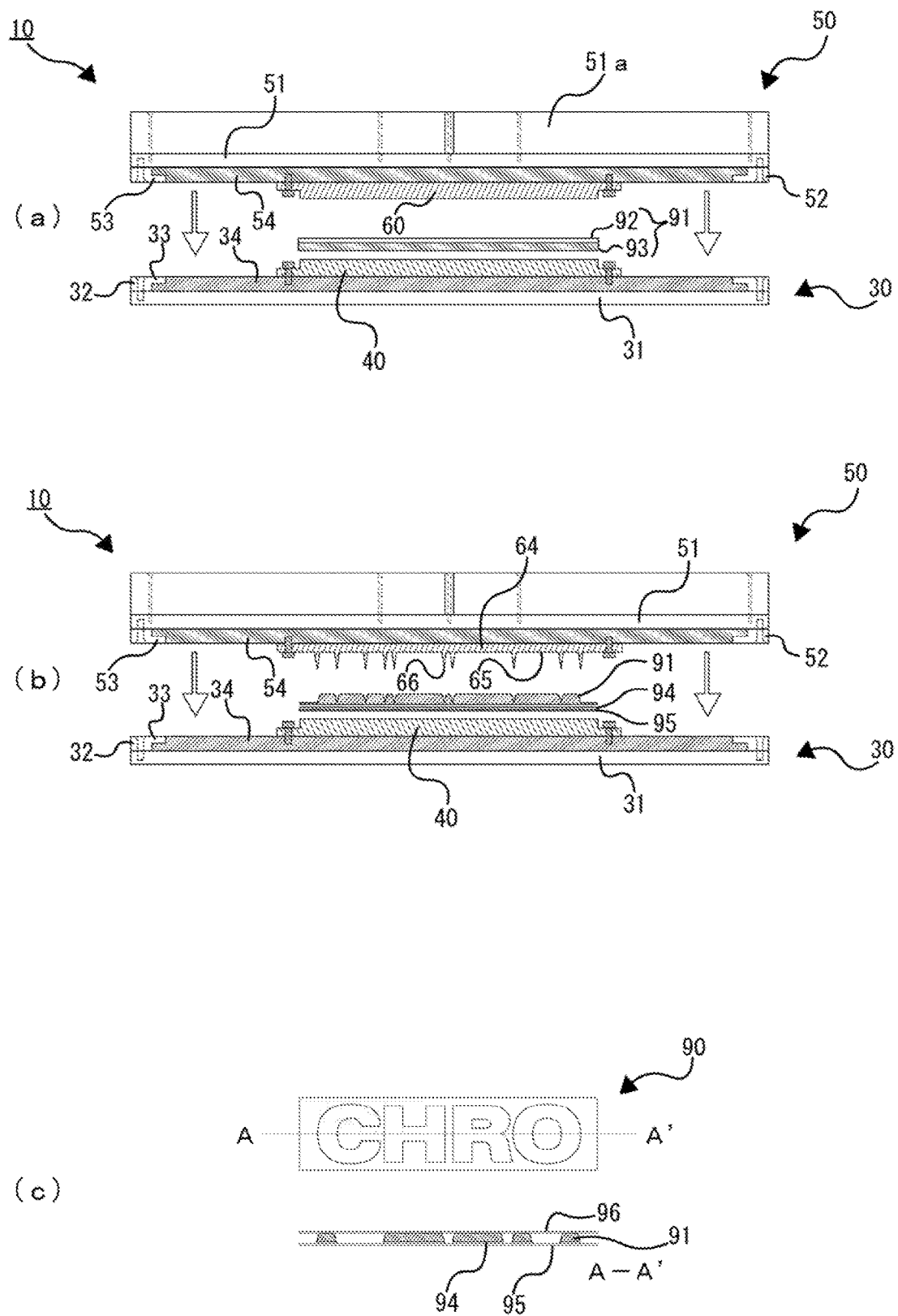
FIG. 12 is an explanatory diagram of a production method that uses a production device of the second embodiment of the present invention.

In the present embodiment, the production device 10 shown in FIGS. 4 and 5 is used in which dies different from those of the first embodiment are mounted as the production device 10. Specifically, in the first jig 30, as illustrated in FIGS. 12(a) and 12(b), only the first flat-plate die 40 is mounted on the first slide plate 34, while in the second jig 50, the second flat-plate die 60 illustrated in FIG. 12(a) and a second engraved die 64 with fusion-cutting blades are mounted on the second slide plate 54. Note that the second engraved die 64 with the fusion-cutting blades has recesses 65 having a depth that is greater than the thickness of the decorative piece 90 to be obtained, and includes fusion-cutting blades 66 at peripheral edges of the recesses 65.

Then, the first jig 30 and the second jig 50 to which the die 40 and the dies 60 and 64 are respectively mounted are fastened to a high-frequency dielectric heating device, which is not shown, such that the first jig 30 is located on the lower side and the second jig 50 is located on the upper side.

Then, as is the case with the first embodiment, the softening step (see FIG. 2) of softening the decorative piece material 91 is performed using the production device 10. As illustrated in FIG. 12(a), in both the first jig 30 and the second jig 50, the slide plates 34 and 54 are positioned such that the flat-plate dies 40 and 60 are located centrally, and the decorative piece material 91 is placed on top of the first flat-plate die 40. In this state, the second jig 50 is moved downward, and while the decorative piece material 91 is thereby pressed, high-frequency dielectric heating is performed using the flat-plate dies 40 and 60 as electrodes, thereby softening and welding the entire decorative piece material 91. When the softening is completed, the second jig 50 is moved upward.

Subsequently, with the first jig 30 left as it is, the second slide plate 54 of the second jig 50 is slid, thereby moving the second engraved die 64 with the fusion-cutting blades to the center as illustrated in FIG. 12(b). Then, the double-sided tape 94 to which the release paper 95 is attached is disposed on the first flat-plate die 40 of the first jig 30 or attached to the decorative piece material 91, and the decorative piece material 91 is placed thereon with the upper layer 92 facing upward. Subsequently, the second jig 50 is moved downward, and while the decorative piece material 91 is thereby pressed, high-frequency dielectric heating is performed using the first flat-plate die 40 and the second engraved die 64 with the fusion-cutting blades as electrodes (shaping step in FIGS. 11(a) to 11(c)). Since the entire decorative piece material 91 is softened due to the softening step, the decorative piece material 91 is shaped within the recesses 65 of the second engraved die 64 with the fusion-cutting blades through high-frequency dielectric heating, and thus, a design with a slightly round-shaped surface is formed. Moreover, the decorative piece material 91 and the double-sided tape 94 are fusion-cut along the outlines of the design by the fusion-cutting blades 66. After that, the second jig 50 is moved upward, and the decorative piece material 91 is removed.

Since the removed decorative piece material 91 is attached to the release paper 95 via the double-sided tape 94, the decorative piece material 91 can be removed from the production device 10 without positional displacement occurring. In this state, unnecessary portions are eliminated from the decorative piece material 91, and the application film 96 is attached to a surface of the decorative piece material 91 on the opposite side to the release paper 95. Thus, a decorative piece 90 can be obtained as illustrated in FIG. 12(c).

In the above-described production device 10, the slide plates 34 and 54 are respectively disposed in the first jig 30 and the second jig 50, and different types of dies are fastened to these slide plates 34 and 54. However, in the first jig 30, the first flat-plate die 40 may be disposed non-slidably.

Figure 11:
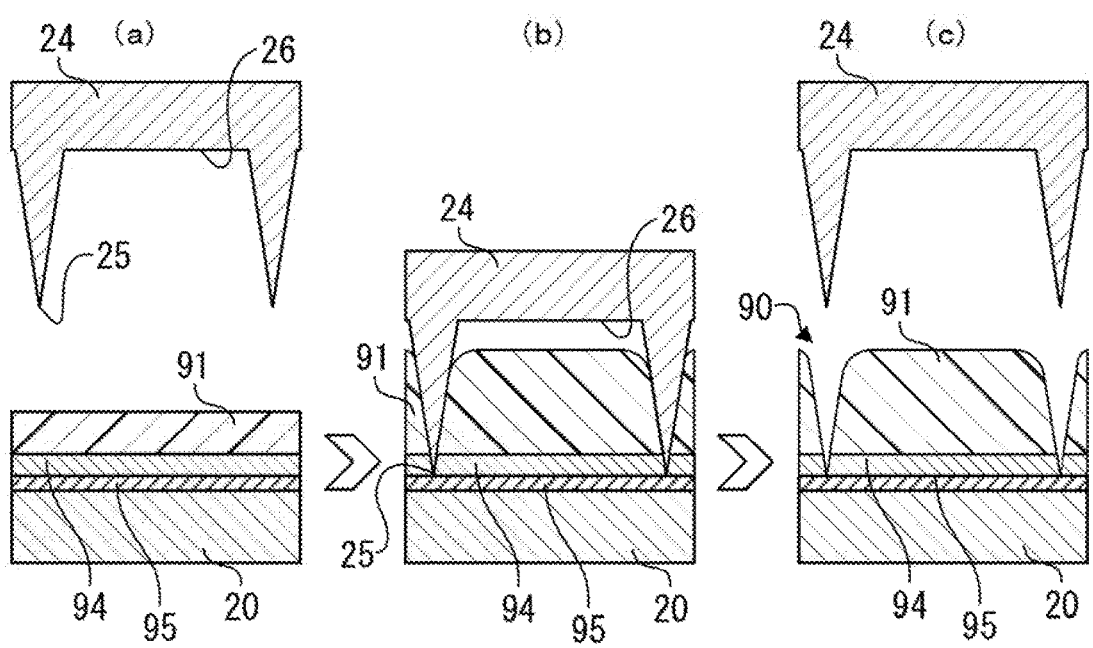
FIG. 11 is an explanatory diagram illustrating a shaping and fusion-cutting step according to a second embodiment of the present invention.

In the present embodiment as well, replacement of the die can be achieved simply by sliding the second slide plate 54, and the softening step (FIG. 2), the shaping and fusion-cutting step (FIGS. 11(a)-11 (c)) can be performed immediately one after the other using the same device.

Moreover, since the softening step allows the entire decorative piece material 91 to be softened in advance even when the decorative piece material 91 is thick, the above-described embodiment is particularly preferable for the production of a bulky decorative piece 90 having a three-dimensional appearance and a sense of luxuriousness. For example, if a decorative piece material 91 that is 2.3 mm to 6 mm thick is used, a decorative piece 90 having a thickness of 2.5 mm to 6.2 mm can be produced.

Third Embodiment

In a third embodiment, after the softening step, a shaping step and a fusion-cutting step are performed as is the case with the first embodiment. Note that, unless otherwise specified, the same reference numerals as those of the first embodiment and the second embodiment denote the same or similar members, and a description thereof is omitted as appropriate.

As is the case with the first embodiment and the second embodiment, the decorative piece material 91 is subjected to the softening step illustrated in FIG. 2.

Figure 13:
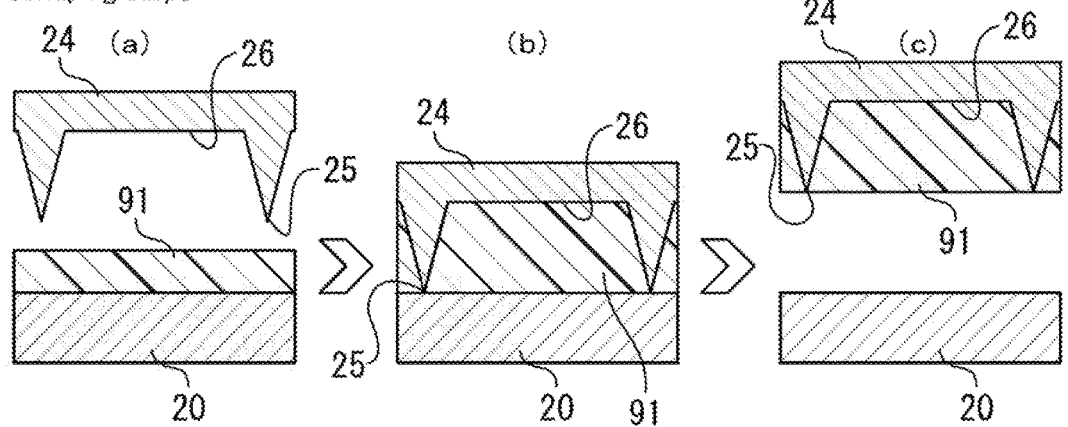
FIG. 13 is an explanatory diagram illustrating a shaping step and a fusion-cutting step according to a third embodiment of the present invention.
Figure 13:
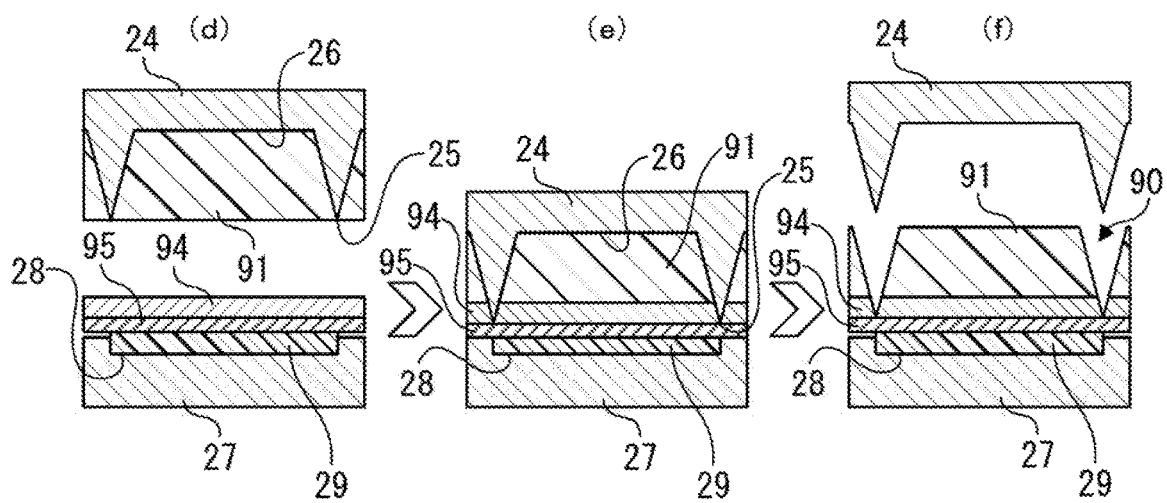

After the softening step, in the third embodiment, the decorative piece material 91 is shaped as illustrated in FIGS. 13(a) to 13(c) (shaping step), and subsequently the shaped decorative piece material 91 is fusion-cut as illustrated in FIGS. 13(d) to 13(f) (fusion-cutting step).

In the shaping step, as illustrated in FIG. 13(a), the first flat-plate die 20 used in the softening step in FIG. 2 is used, and the engraved die 24 with the fusion-cutting blades is used in place of the second flat-plate die 21. As illustrated in FIG. 13(a), the engraved die 24 with the fusion-cutting blades is a die in which the recesses 26 of the design are formed and the fusion-cutting blades 25 are formed along the outlines of the design. While the decorative piece material 91 that is in the softened state due to the softening step is still placed on top of the first flat-plate die 20, the engraved die 24 with the fusion-cutting blades is brought closer to the first flat-plate die 20 as illustrated in FIG. 13(b), and high-frequency dielectric heating is performed. Thus, the decorative piece material 91 is shaped in conformity with the recesses 26 of the engraved die 24 with the fusion-cutting blades. At this time, the decorative piece material 91 is partially fusion-cut by the fusion-cutting blades 25. In the shaping step, since the decorative piece material 91 that is softened in its entirety in advance is shaped, the shaping can be performed even when the decorative piece material 91 is thick. After the shaping, the decorative piece material 91 is held on the engraved die 24 with the fusion-cutting blades using gummed tape or the like, and in this state, the engraved die 24 with the fusion-cutting blades is moved upward as illustrated in FIG. 13(c). Then, the procedure proceeds to the fusion-cutting step.

In the fusion-cutting step, the first flat-plate die 20 is replaced with a flat-plate die 27 with cushioning materials in which, as illustrated in FIG. 13(d), cushioning material recesses 28 are formed at positions corresponding to respective portions of the design, the cushioning material recesses 28 being smaller than the respective portions of the design by about 0.3 mm to 1 mm, and cushioning materials 29 are arranged in the cushioning material recesses 28. The cushioning materials 29 may be made of cellular rubber, for example, and has such a thickness that the cushioning materials 29 protrude from the cushioning material recesses 28 for about 0.2 mm to 0.4 mm.

Then, as illustrated in FIG. 13(d), the release paper 95 is disposed on the lower layer 93 side of the decorative piece material 91, on top of the flat-plate die 27 with the cushioning materials in FIG. 13(d), with the double-sided tape 94 located on the upper side.

Subsequently, as illustrated in FIG. 13(e), the engraved die 24 with the fusion-cutting blades on which the decorative piece material 91 is held is brought closer to the flat-plate die 27 with the cushioning materials, and high-frequency dielectric heating is performed. Due to the repulsive force of the cushioning materials 29, the decorative piece material 91 is strongly pressed against and hence attached to the double-sided tape 94, and is also fusion-cut or cut by the fusion-cutting blades 25. Note that the release paper 95 is not cut by the fusion-cutting blades 25.

After that, unnecessary portions of the decorative piece material 91 are eliminated, and the application film 96 is attached to the upper layer 92 side of the decorative piece material 91 so as to prevent displacement of the design. Thus, a decorative piece 90 can be obtained.

According to the third embodiment of the present invention, a decorative piece 90 can be produced by performing the shaping and fusion-cutting step by replacing the dies after the softening step.

As described above, replacement of the dies is needed when producing a decorative piece 90. Hereinafter, a production device 10 with which a decorative piece 90 can be produced by favorably replacing the dies will be described.

Production Device of Third Embodiment

Figure 14:
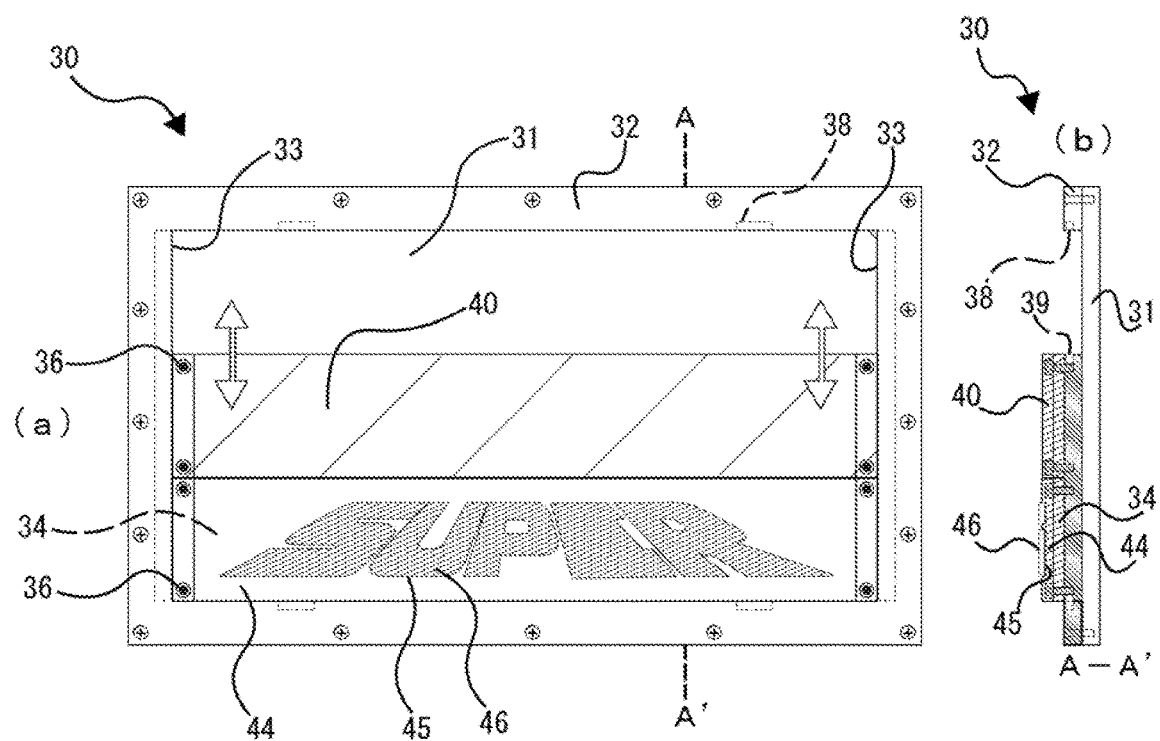
FIG. 14 shows (a) a plan view and (b) a vertical horizontal cross-sectional view of the first jig that is used in a third production method of the present invention.
Figure 15:
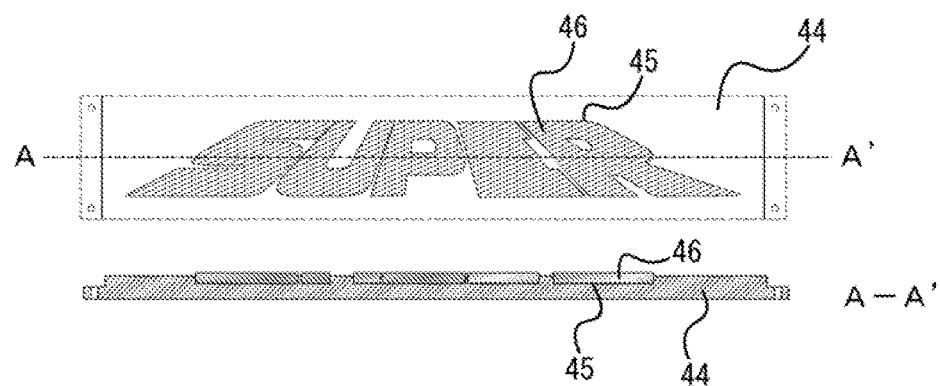
FIG. 15 shows a plan view and a cross-sectional view of a recessed die with cushioning materials that is to be fastened to the first jig in FIG. 14.
Figure 16:
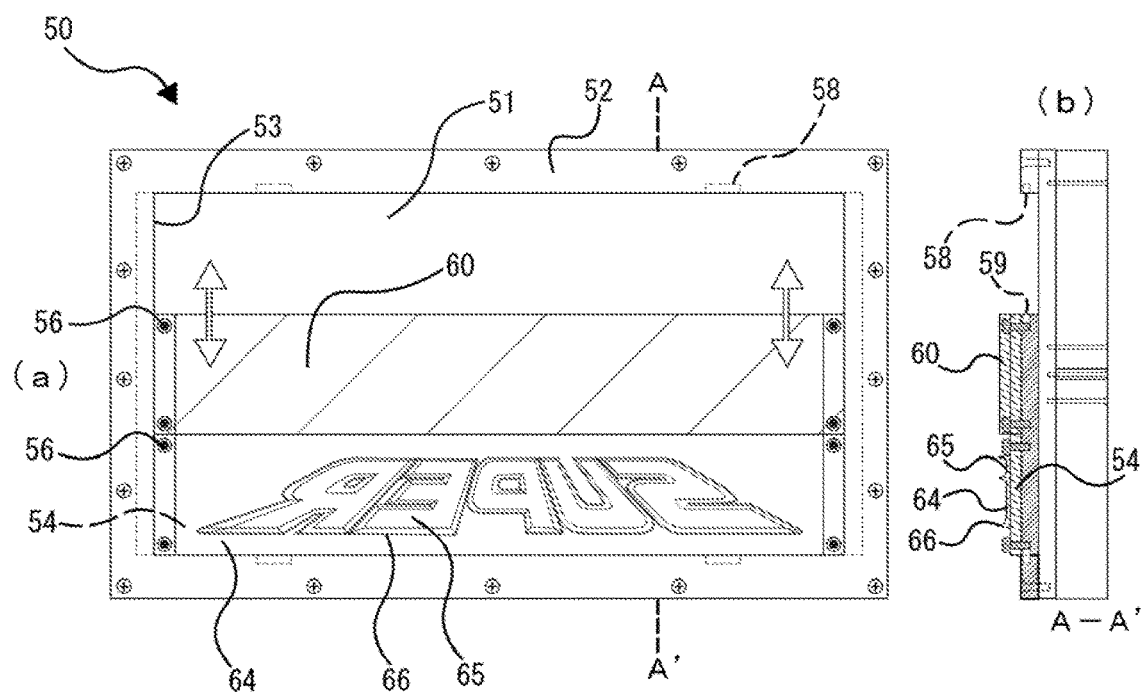
FIG. 16 shows (a) a bottom view and (b) a horizontal cross-sectional view of the second jig that is used in the third production method of the present invention.
Figure 17:
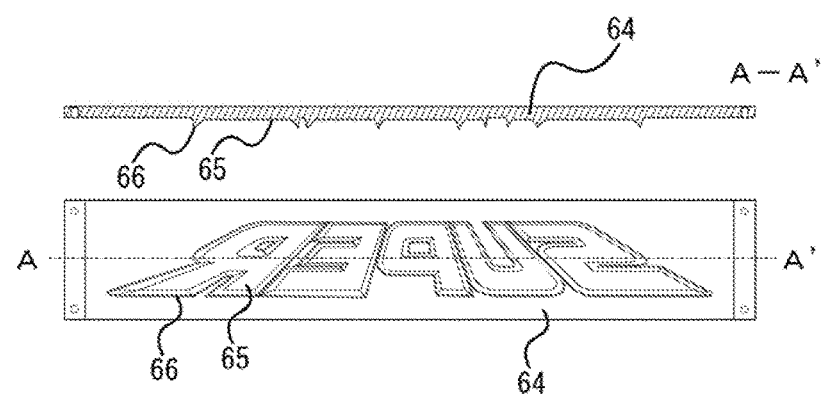
FIG. 17 shows a plan view and a cross-sectional view of an engraved die with fusion-cutting blades that is to be fastened to the second jig in FIG. 16.

In the present embodiment, the production device 10 shown in FIGS. 4 and 5 is used in which dies different from those of the first embodiment are mounted as the production device 10. Specifically, in the first jig 30, as illustrated in FIGS. 14(a) and 14(b), the first flat-plate die 40 and a flat-plate die 44 with cushioning materials (see FIG. 15) are mounted on the first slide plate 34. Note that the flat-plate die 44 with the cushioning materials is a die in which cushioning material recesses 45 are formed at positions corresponding to and inward of respective portions of the design as described above and cushioning materials 46 are arranged in the cushioning material recesses 45. In the second jig 50, the second flat-plate die 60 shown in FIG. 16(a) and the second engraved die 64 with the fusion-cutting blades (see FIG. 17) are mounted on the second slide plate 54. Moreover, in the present embodiment, the design to be applied to the decorative piece 90 is "SUPER".

Then, the first jig 30 and the second jig 50 to which the dies 40 and 44 and the dies 60 and 64 are respectively mounted are fastened to a high-frequency dielectric heating device, which is not shown, such that the first jig 30 is located on the lower side and the second jig 50 is located on the upper side.

Then, as is the case with the first embodiment, the softening step (see FIG. 2) of softening the decorative piece material 91 is performed using the production device 10. As illustrated in FIG. 18(a), in both the first jig 30 and the second jig 50, the slide plates 34 and 54 are positioned such that the flat-plate dies 40 and 60 are located centrally, and the decorative piece material 91 is placed on top of the first flat-plate die 40 such that the upper layer 92 faces upward. In this state, the second jig 50 is moved downward, and while the decorative piece material 91 is thereby pressed, high-frequency dielectric heating is performed using the flat-plate dies 40 and 60 as electrodes, thereby softening and welding the entire decorative piece material 91. When the softening is completed, the second jig 50 is moved upward.

Subsequently, with the first jig 30 left as it is, the second slide plate 54 of the second jig 50 is slid, thereby moving the second engraved die 64 with the fusion-cutting blades to the center as illustrated in FIG. 18(b). Then, the second jig 50 is moved downward, and while the decorative piece material 91 is thereby pressed, high-frequency dielectric heating is performed using the first flat-plate die 40 and the second engraved die 64 with the fusion-cutting blades as electrodes (shaping step in FIGS. 13(a) to 13(c)). Since the entire decorative piece material 91 is softened due to the softening step, the decorative piece material 91 is shaped in conformity with the recesses 65 of the second engraved die 64 with the fusion-cutting blades through high-frequency dielectric heating. Moreover, the decorative piece material 91 is partially fusion-cut by the fusion-cutting blades 66. After that, the decorative piece material 91 is cooled. The cooling may be performed through natural cooling, for example, or may be performed through water-cooling or the like of the dies or the like with use of a chiller in order to shorten the cooling time.

In this state, the decorative piece material 91 is held on the second engraved die 64 with fusion-cutting blades using gummed tape or the like, and the second jig 50 is moved upward as illustrated in FIG. 18(b).

Next, as illustrated in FIG. 18(c), the first slide plate 34 of the first jig 30 is slid to the back side, thereby moving the flat-plate die 44 with the cushioning materials to the center (a portion indicated by the oblique lines in FIG. 14(a)). Then, the double-sided tape 94 to which the release paper 95 is attached is placed on top of the flat-plate die 44 with the cushioning materials such that the release paper 95 is located on the lower side. In this state, the second jig 50 is moved downward, and while the decorative piece material 91 is thereby pressed, high-frequency dielectric heating is performed again using the flat-plate die 44 with the cushioning materials and the second engraved die 64 with the fusion-cutting blades as electrodes (fusion-cutting step in FIGS. 13(d) to 13(f)). The cushioning materials 46 allow the decorative piece material 91 to be strongly attached to the double-sided tape 94, and the decorative piece material 91 and the double-sided tape 94 are fusion-cut by the fusion-cutting blades 66 along the outlines of the design by the fusion-cutting blades 66. After that, the second jig 50 is moved upward, and the decorative piece material 91 is removed.

Figure 18:
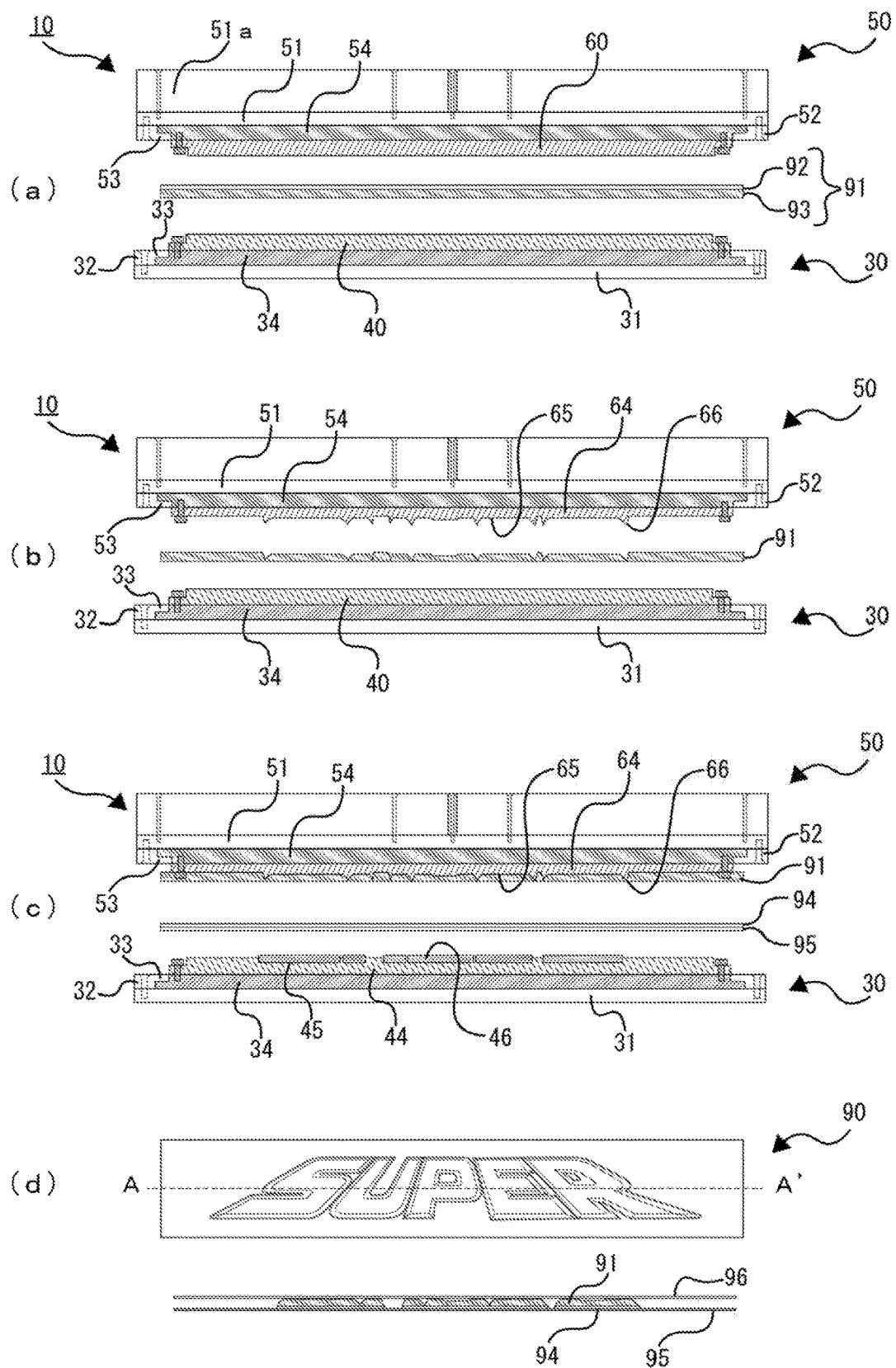
FIG. 18 is an explanatory diagram of the production method that uses a third production device of the present invention.

Since the removed decorative piece material 91 is attached to the release paper 95 via the double-sided tape 94, the decorative piece material 91 can be removed from the production device 10 without positional displacement occurring. In this state, unnecessary portions are eliminated from the decorative piece material 91, and the application film 96 is attached to a surface of the decorative piece material 91 on the opposite side of the release paper 95. Thus, a decorative piece 90 can be obtained as illustrated in FIG. 18(*d*).

The obtained decorative piece 90 can be affixed to a product without positional displacement occurring, by peeling off the release paper 95, attaching the decorative piece 90 to the product via the double-sided tape 94, and then peeling off the application film 96.

In the above-described embodiment, the slide plates 34 and 54 are respectively disposed in the first jig 30 and the second jig 50, and different types of dies are fastened to these slide plates 34 and 54. Therefore, replacement of the dies can be achieved simply by sliding the slide plates 34 and 54, and the softening step (FIG. 2), the shaping step (FIGS. 13(*a*) to 13(*c*)), and the fusion-cutting step (FIGS. 13(*d*) to 13(*f*)) can be performed immediately one after another using the same device.

Moreover, since the softening step allows the entire decorative piece material 91 to be softened in advance even when the decorative piece material 91 is thick, the above-described embodiment is particularly preferable for the production of a bulky decorative piece 90 having a three-dimensional appearance and a sense of luxuriousness. For example, if a decorative piece material 91 that is 2.3 mm to 6 mm thick is used, a decorative piece 90 having a thickness of 2.5 mm to 6.2 mm can be produced.

The foregoing description is given merely to describe the present invention, and therefore should not be construed as limiting the invention recited in the appended claims or narrowing the scope of the present invention. Also, the constituent elements of the present invention are not limited to those described in the embodiments above, and it is of course possible to make various modifications within the technical scope defined in the appended claims.

It is also possible to combine the dies of the foregoing first to third embodiments. Moreover, the types of the dies that are mounted to the first jig 30 and the second jig 50 are not limited to those described above in the embodiments, and it is of course also possible to exchange the positions of the upper and lower dies, for example. Furthermore, regarding the shape of the recesses of the dies, any shapes, such as a mountain shape, a trapezoidal shape, and a round shape, and combinations of these shapes can be adopted.

In the embodiments, a plurality of dies are mounted to the first jig 30 and the second jig 50 in order to simplify the die replacement. However, it is of course also possible to realize the present invention in a manner in which dies are replaced as appropriate, or dies are respectively mounted on a plurality of high-frequency induction heating devices.

In addition, the layer configurations, the materials, and the like of the decorative piece material 91 are given by way of example only, and it should be understood that various changes can be made thereto.

LIST OF REFERENCE NUMERALS

10 Production device
20 First flat-plate die
21 Second flat-plate die
22 Engraved die
24 Engraved die with fusion-cutting blade
30 First jig
34 First slide plate
40 First flat-plate die
41 First engraved die with fusion-cutting blade
44 Flat plate die with cushioning material
50 Second jig
54 Second slide plate
60 Second flat-plate die
61 Second engraved die
64 Second engraved die with fusion-cutting blade
90 Decorative piece
91 Decorative piece material

The invention claimed is:

1. A method for producing a decorative piece made of a thermoplastic synthetic resin, comprising:
    a step of preparing a decorative piece material including an upper layer that has a thermoplastic synthetic resin film and a lower layer that includes a thermoplastic synthetic resin sheet;
    a step of disposing the decorative piece material on a flat-plate die serving as an electrode;
    a softening step of softening the decorative piece material by bringing a flat-plate die serving as another electrode closer to the flat-plate die serving as the electrode, and performing high-frequency dielectric heating while pressing the decorative piece material; after the softening step,
    a step of disposing the decorative piece material on a flat-plate die serving as an electrode such that the lower layer side of the decorative piece material abuts against the flat-plate die;
    a shaping step of shaping the decorative piece material by bringing an engraved die, the engraved die serving as an electrode and having a recess of a design to be formed in the decorative piece material, closer to the flat-plate die on which the decorative piece material is disposed, and performing high-frequency dielectric heating while pressing the decorative piece material;
    a step of disposing a piece of release paper on the lower layer side of the decorative piece material via a piece of double-sided tape or a thermal bonding film and disposing the decorative piece material on a flat-plate die serving as an electrode such that the release paper abuts against the flat-plate die; and
    a fusion-cutting step of bringing a fusion-cutting blade die closer to the flat-plate die, the fusion-cutting blade die serving as an electrode and having a recess of the design formed in the decorative piece material and a fusion-cutting blade provided along an outline of the design, and performing high-frequency dielectric heating while pressing the decorative piece material, to thereby fusion-cut the decorative piece material using the fusion-cutting blade.

2. The method for producing a decorative piece made of a thermoplastic synthetic resin according to claim 1, further comprising:
    after the fusion-cutting step,
    a step of removing the decorative piece material, eliminating an unnecessary portion, and then attaching an application film for holding the design in position to the upper layer side of the decorative piece material.

\* \* \* \* \*